(12) United States Patent
Baric et al.

(10) Patent No.: US 9,869,348 B2
(45) Date of Patent: Jan. 16, 2018

(54) WHEEL PRELOAD DEVICE

(71) Applicant: Parker-Hannifin Corporation, Cleveland, OH (US)

(72) Inventors: Thomas James Baric, Trafford, PA (US); Michael D. Bridges, Monroeville, PA (US); Adis Halimic, Cheswick, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/110,147

(22) PCT Filed: Jan. 21, 2015

(86) PCT No.: PCT/US2015/012166
§ 371 (c)(1),
(2) Date: Jul. 7, 2016

(87) PCT Pub. No.: WO2015/112544
PCT Pub. Date: Jul. 30, 2015

(65) Prior Publication Data
US 2016/0327087 A1  Nov. 10, 2016

Related U.S. Application Data (60) Provisional application No. 61/930,100, filed on Jan. 22, 2014.

(51) Int. Cl.
*F16C 29/12* (2006.01)
*F16C 29/04* (2006.01)
*F16H 19/06* (2006.01)

(52) U.S. Cl.
CPC .......... *F16C 29/123* (2013.01); *F16C 29/045* (2013.01); *F16C 2322/39* (2013.01); *F16H 2019/0686* (2013.01)

(58) Field of Classification Search
CPC ...... F16C 29/045; F16C 29/12; F16C 29/123; F16C 2322/39; F16H 2019/0686
(Continued)

(56) References Cited

U.S. PATENT DOCUMENTS 1,923,853 A * 8/1933 Van Duyn ................ B26D 7/00
16/91
1,926,828 A  9/1933 Berkel
(Continued)

FOREIGN PATENT DOCUMENTS

EP  1 203 891 A2  5/2002
JP  H11 37154 A  2/1999

OTHER PUBLICATIONS

International Search Report and Written Opinion for corresponding Application No. PCT/US2015/012166 dated Jun. 8, 2015.

*Primary Examiner* — James Pilkington
(74) *Attorney, Agent, or Firm* — Renner, Otto, Boisselle & Sklar, LLP (57) ABSTRACT

Provided is a carriage assembly 16 including a carriage 50, a wheel bar 90 that is deflectable relative to the carriage 50, and a plurality of wheels 92, 94, 96 mounted to the bar 90 for rotation around a respective axis 98, 100, 102, the axis 100 of at least one of the wheels 94 being offset from the axis 98, 102 of at least one of the other wheels 92, 96 in a direction of the wheel bar deflection. The wheel bar 90 is deflected relative to the carriage 50 to allow the wheels 92, 94, 96 to engage respective rails 32, 34 in a track 30 to eliminate or reduce play between the wheels and the track.

25 Claims, 8 Drawing Sheets

(58) Field of Classification Search
USPC .......................... 384/10, 50, 54, 56, 57, 58
See application file for complete search history.

(56) References Cited

U.S. PATENT DOCUMENTS

| | | | |
|---|---|---|---|
| 4,390,216 A | 6/1983 | Mueller et al. | |
| 6,450,687 B1* | 9/2002 | Schroeder | F16C 29/005 384/50 |
| 2007/0034292 A1* | 2/2007 | Smith | B23D 47/025 144/286.5 |
| 2011/0209306 A1* | 9/2011 | Pritz | E05D 15/0626 16/91 |

* cited by examiner

WHEEL PRELOAD DEVICE

This application is a national phase of International Application No. PCT/US2015/012166 filed Jan. 21, 2015 and published in the English language.

FIELD OF INVENTION

The present invention relates generally to linear modules, and more particularly to carriage assemblies for linear modules.

BACKGROUND

Linear modules, such as belt driven linear modules, may be provided for construction of machines and handling systems. For example, a belt driven linear module may be provided for materials handling, warehouse use such as parts picking, storage and retrieval, machine tool automation use such as workpiece loading and unloading, testing use such as guiding ultrasonic sensors or laboratory equipment, etc.

The linear module includes a housing having a guideway, a carriage having roller bearing wheels on three sides to provide smooth linear motion and support of the carriage as it moves along the guideway, a drive belt connected to the carriage for providing high speed, high force, and high acceleration movement of the carriage, and a motor for driving the drive belt. The carriage includes a mounting surface, for example for vertical or multi-axis mounting. A suitable component may be coupled to the mounting surface, such as a robot arm, such that linear motion of the carriage effects linear motion of the component.

SUMMARY OF INVENTION

The present invention provides a carriage assembly including a carriage, a wheel bar that is deflectable relative to the carriage, and a plurality of wheels mounted to the bar for rotation around a respective axis, the axis of at least one of the wheels being offset from the axis of at least one of the other wheels in a direction of the wheel bar deflection. The wheel bar is deflected relative to the carriage to allow the wheels to engage respective rails in a track to eliminate or reduce play between the wheels and the track.

According to one aspect of the invention, a carriage assembly is provided. The carriage assembly includes a carriage extending in a longitudinal direction, at least one deflectable wheel bar extending in the longitudinal direction and being deflectable relative to the carriage in a normal direction perpendicular to the longitudinal direction and a lateral direction, and a plurality of wheels spaced longitudinally along the bar and mounted to the bar for rotation around a respective axis extending in the lateral direction, wherein the axis of at least one of the wheels is offset in the normal direction from the axis of at least one of the other wheels.

The carriage assembly may further include a fixing device for fixing the deflectable wheel bar in a deflected state to the carriage against deflection.

The carriage assembly may further include a holding device for restricting longitudinal movement of the wheel bar relative to the carriage in at least one direction.

The carriage may include a body and at least one channel extending longitudinally along the body, and wherein the deflectable wheel bar is configured to be received in the channel.

The carriage assembly may further include three deflectable wheel bars and three sets of wheels, each set of wheels being mounted to a respective one of the deflectable wheel bars, wherein the wheel bars are configured to be received in a respective one of the three channels.

The plurality of wheels may include first, second and third wheels spaced longitudinally along the bar and mounted to the bar for rotation around a respective axis extending in the lateral direction, wherein the axis of the third wheel is aligned with the axis of the first wheel.

According to another aspect of the invention, another carriage assembly may be provided. The carriage assembly includes a carriage extending in a longitudinal direction, a wheel bar extending in the longitudinal direction, and a plurality of wheels each having a diameter and being mounted to the wheel bar for rotation around a respective axis extending in a lateral direction, wherein the bar is flexible to allow at least one of the wheels to move in a normal direction perpendicular to the longitudinal direction and the lateral direction relative to the other of the plurality of wheels, wherein the axis of at least one wheel movable in the normal direction is offset in the normal direction from the axis of at least one of the other wheels such that when the plurality of wheels are inserted into a channel of a module body having upper and lower rails spaced from one another a distance less than the offset between the wheels plus the diameter of one of the wheels, the at least one wheel movable in the normal direction engages one of the upper or lower rail and the at least one of the other of the plurality of wheels engages the other of the upper or lower rail.

The carriage assembly may further include a fixing device for fixing the deflectable wheel bar in a deflected state to the carriage against deflection.

The carriage may include a body and at least one channel extending longitudinally along the body, and wherein the wheel bar is configured to be received in the channel.

According to still another aspect of the invention, a module may be provided. The module includes a track body having a length extending in a longitudinal direction, a width extending in a lateral direction and a height extending in a normal direction perpendicular to the longitudinal and lateral direction, the track body including at least one channel extending in the longitudinal direction, the at least one channel having upper and lower rails spaced from one another, and a carriage assembly movable relative to the track body, the carriage assembly including a carriage extending in the longitudinal direction, a wheel bar being fixed to the carriage in a deflected state, and a plurality of wheels spaced longitudinally along the wheel bar and mounted to the wheel bar for rotation around a respective axis extending in the lateral direction, the axis of the at least one of the wheels being offset in the normal direction from the axis of at least one of the other wheels, wherein when the wheels of the carriage assembly are inserted into the channel, at least one of the wheels engages the upper rail and at least one of the wheels engages the lower rail.

The upper and lower rails may be spaced apart in the normal direction a distance less than the offset between the wheels plus a diameter of the wheels.

According to a further aspect of the invention, a method of assembling a module including a body and a carriage assembly, the body having a channel with first and second rails and the carriage assembly having a carriage, a wheel bar configured to be fixed to the carriage, and a plurality of wheels mounted to the wheel bar may be provided. The method includes inserting the carriage into the body, and inserting the wheel bar into a channel of the carriage prior to insertion of the carriage into the body, simultaneously with insertion of the carriage into the body, or subsequent to insertion of the carriage into the body, wherein during insertion of the wheel bar, the wheel bar flexes such that at least one of the wheels engages one of the first and second rails and at least one of the wheels offset from the other wheel engages the other of the first and second rails.

According to yet another aspect of the invention, still another carriage assembly may be provided. The carriage assembly includes a carriage extending in a longitudinal direction, an articulated wheel bar composed of multiple segments configured to be fixed to the carriage, at least one of the segments being deflectable relative to at least one of the other segments in a normal direction perpendicular to the longitudinal direction and a lateral direction, and a plurality of wheels each being mounted to one of the multiple segments for rotation around a respective axis extending in the lateral direction. The at least one segment that is deflectable includes a resilient member for moving the segment.

Deflection of one of the segments relative to the other may cause the axis of deflected segment to be offset in the normal direction from the axis of the other segment.

Each segment may be deflectable.

Each of the segments may include a resilient member for deflecting the respective segment.

The carriage assembly may further include a fixing device for fixing the segments to the carriage against deflection.

The foregoing and other features of the invention are hereinafter described in greater detail with reference to the accompanying drawings.

DETAILED DESCRIPTION

The principles of this present application have particular application to motion control systems, such as linear modules for moving a component to multiple locations, and thus will be described below chiefly in this context. It will of course be appreciated, and also understood, that principles of this invention may be applicable to other applications where it is desirable to remove play between a wheel assembly and a track.

Figure 1:
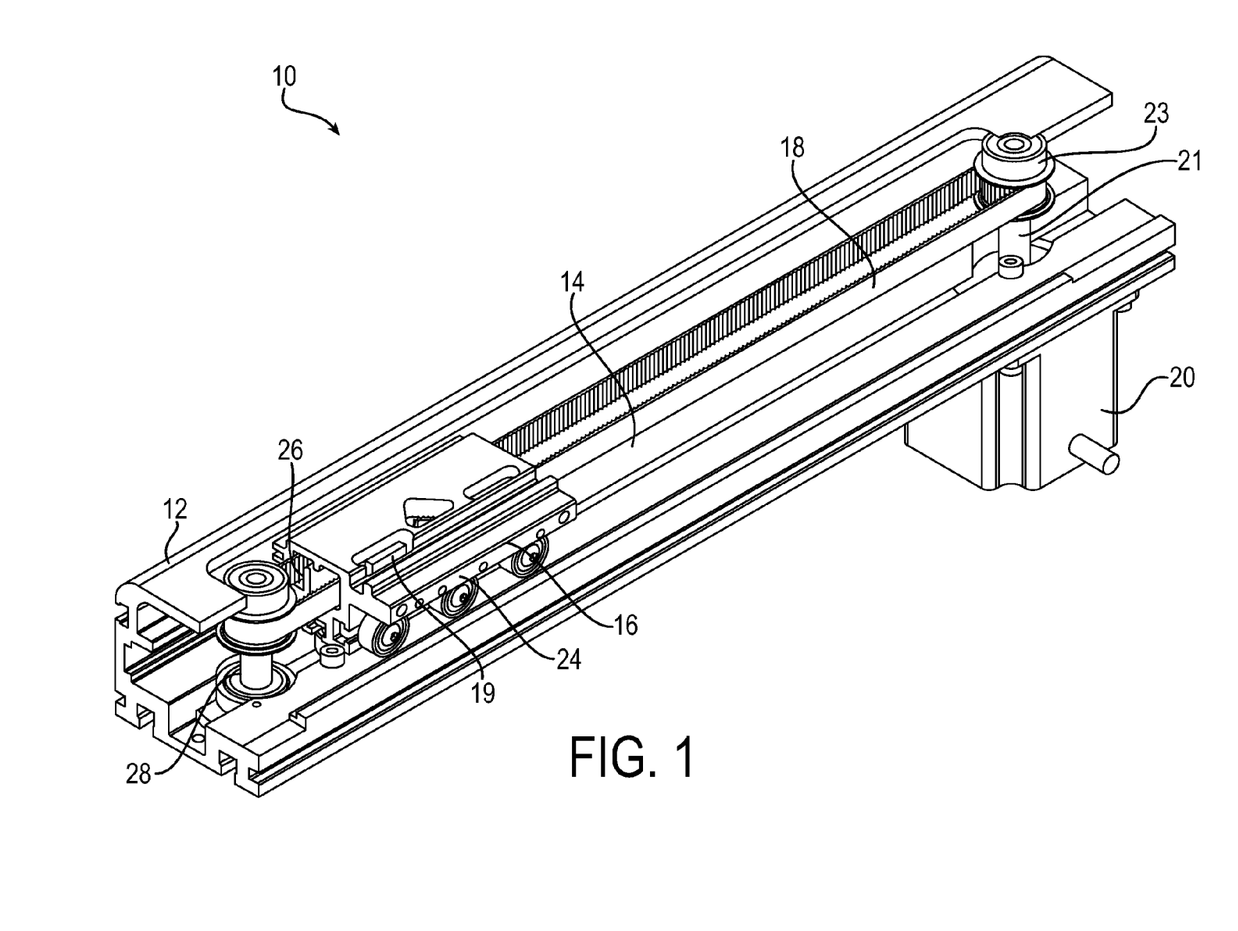
FIG. 1 is a perspective view of an exemplary actuator according to the invention with a portion of the body removed.

Referring now in detail to the drawings, and initially to FIG. 1, an actuator, such as a linear module provided to shuttle a payload to multiple locations, is designated generally by reference numeral 10. The module includes a track body 12 having a passage 14, a carriage assembly 16 configured to be received in the passage 14, a belt 18 fixed to the carriage assembly 16 by a clamp 19, and a motor 20 coupled to the belt 18 for moving the carriage through the passage 14. The passage 14 may open laterally to an outer portion of the track body 12, for example via a longitudinally extending slot 22 (FIG. 2) extending through the track body 12. A mounting surface 24 of the carriage assembly 16 to which the payload is fixed extends through the slot 22.

The motor 20, which may be any suitable motor, includes a motor shaft 21 having a pulley 23 coupled thereto. The belt 18, which may be any suitable belt, such as a steel reinforced timing belt, surrounds the pulley and extends through a belt passage 26 in the carriage assembly 16 that extends longitudinally through the carriage. After the carriage assembly 16 has been installed in the track body 12, a pulley assembly 28 can be installed in the track body 12 for the belt to surround.

Figure 2:
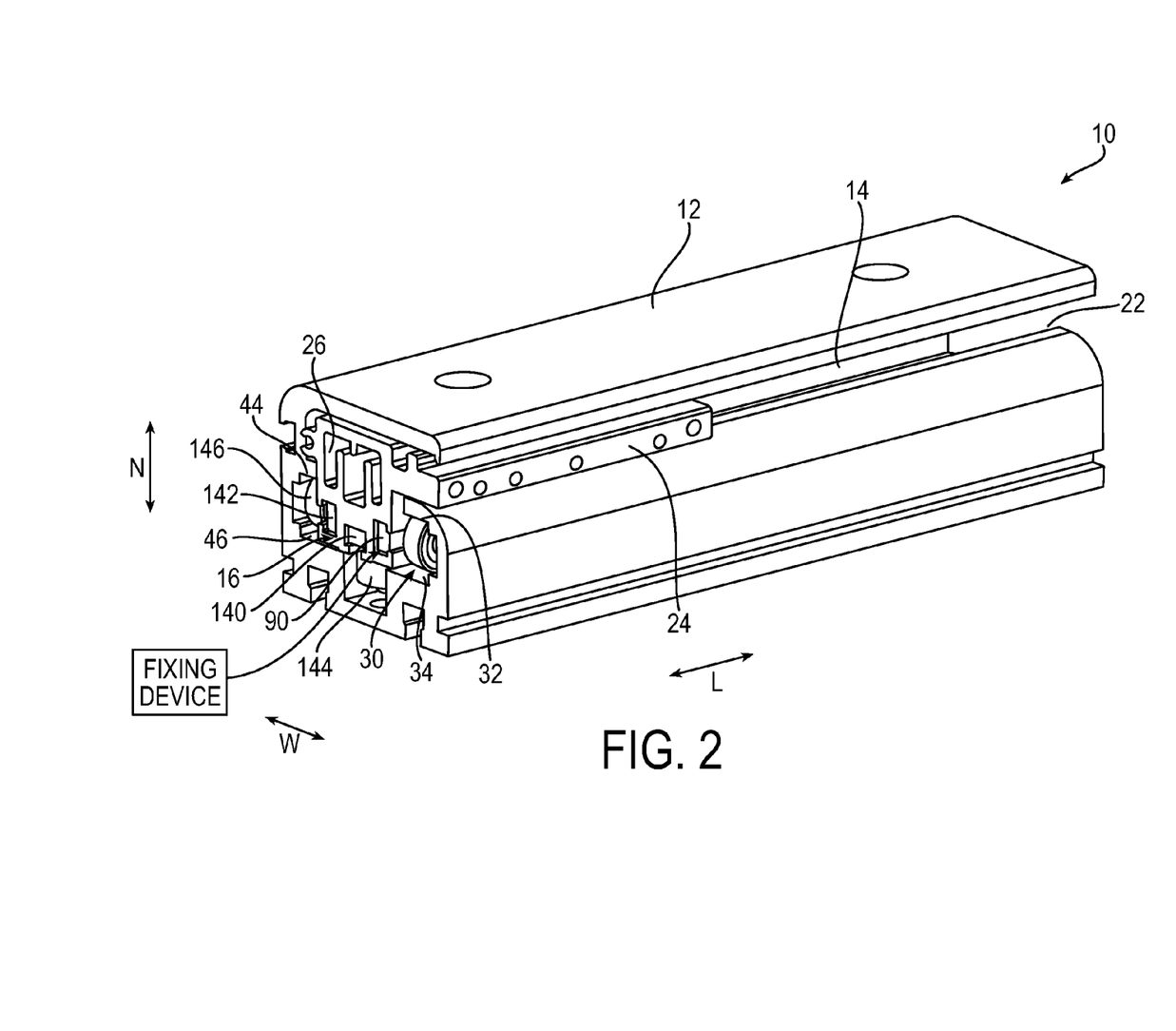
FIG. 2 is another perspective view of the exemplary actuator.

Referring now to FIG. 2, a portion of the track body 12 is shown. The track body 12, which has a length extending in a longitudinal direction L, a width extending in a lateral direction W, and a height extending in a normal direction N perpendicular to the longitudinal and lateral direction, includes at least one channel or track 30 at least partially defining the passage 14 and extending in the longitudinal direction. The track 30 has an upper rail 32 and a lower rail 34 spaced from one another in the normal direction. As illustrated in FIGS. 2 and 2, the track body 12 may also include a second channel or track 36 located any suitable angle, such as ninety degrees from the track 30 and a third channel or track 38 located any suitable angle, such as ninety degrees from the track 36 and is laterally aligned with the track 30. The track 36 has a first side rail 40 and a second side rail 42 spaced from one another in the lateral direction, and the track 38 includes an upper rail 44 and a lower rail 46 spaced from one another in the normal direction.

Figure 3:
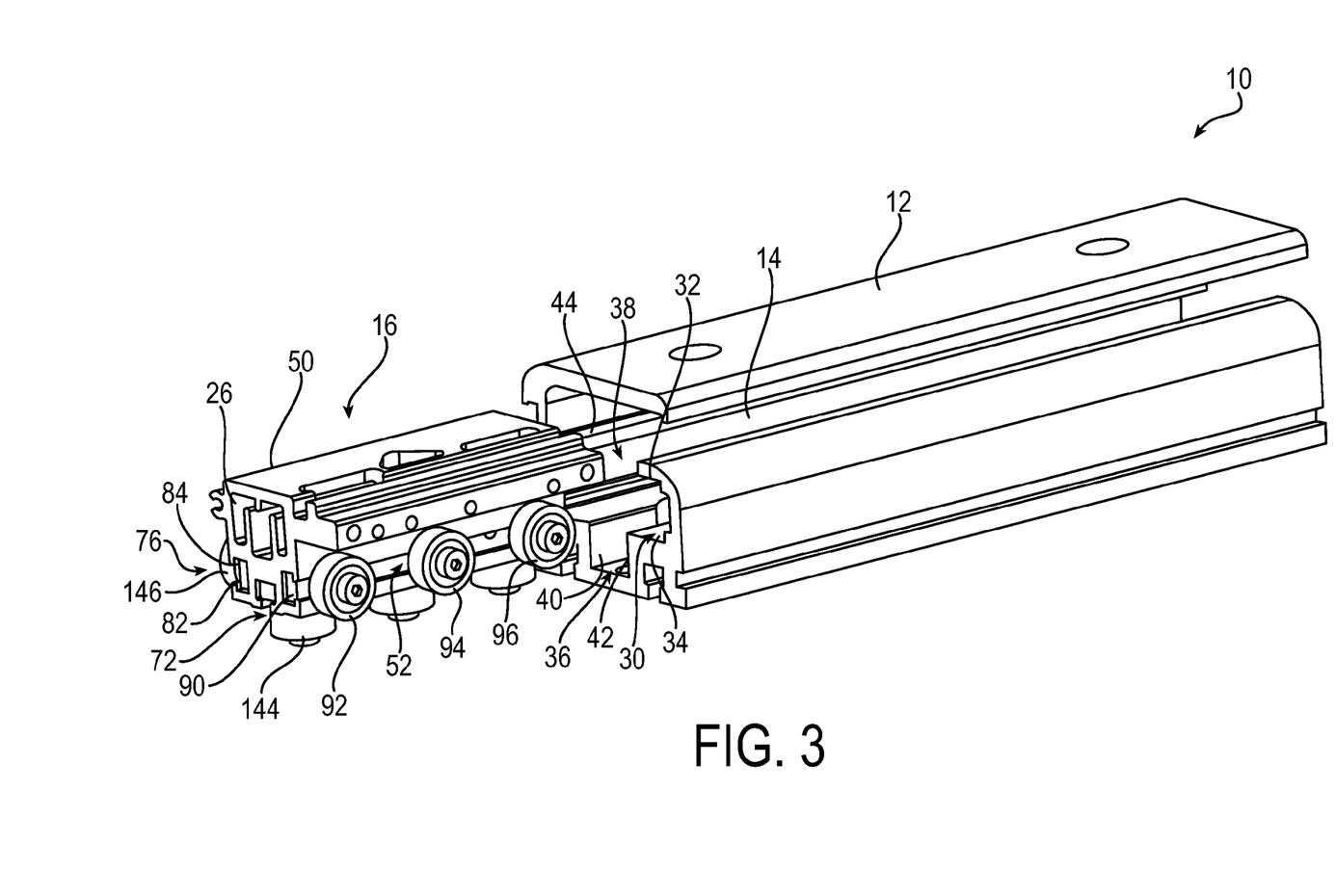
FIG. 3 is still another perspective view of the actuator.
Figure 4:
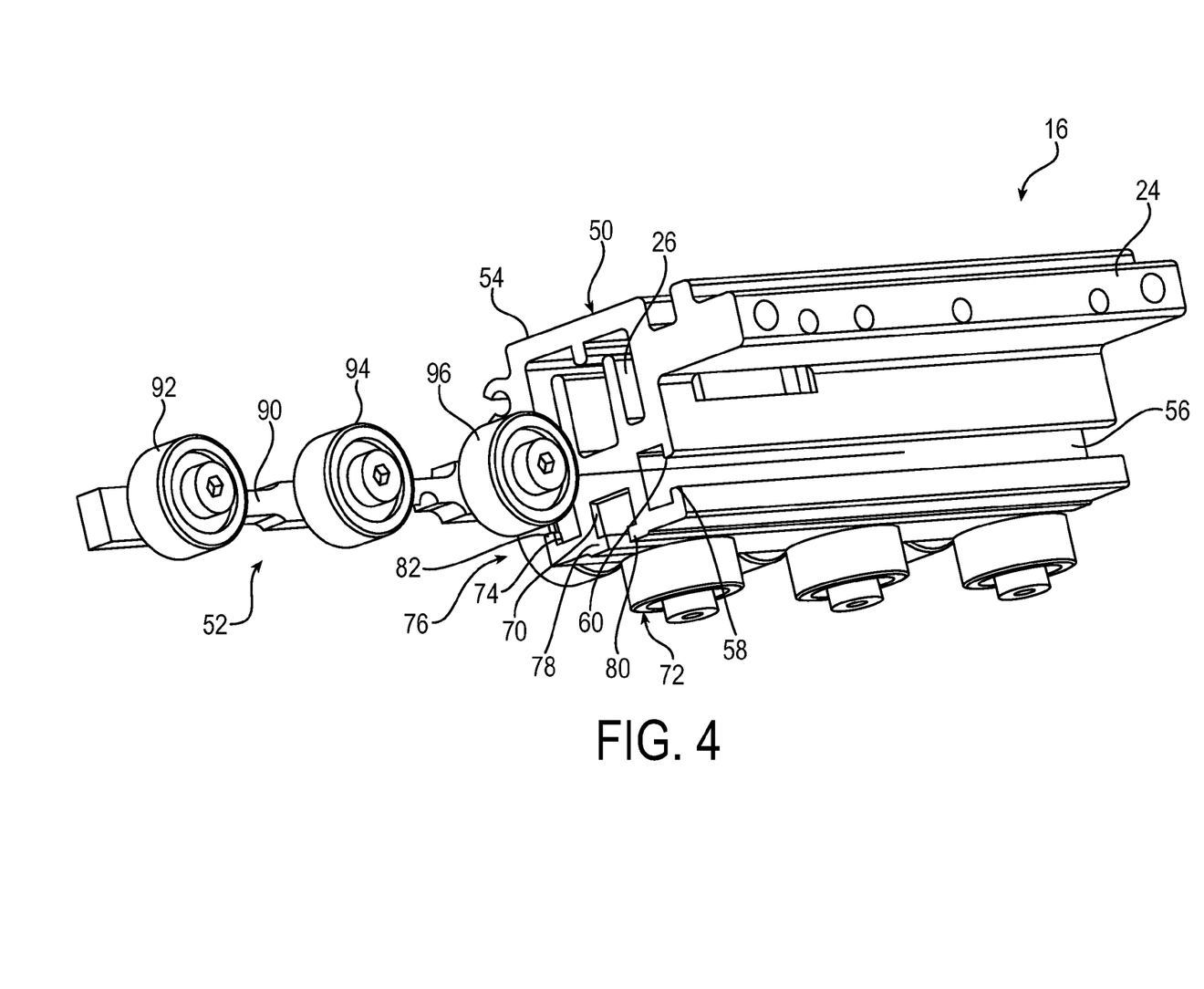
FIG. 4 is a perspective view of an exemplary carriage assembly according to the invention showing a wheel bar assembly removed.

Turning now to FIGS. 3 and 4, the carriage assembly 16 includes a carriage 50 extending in the longitudinal direction and a wheel bar assembly 52 configured to be fixed to the carriage 50. The carriage 50 includes a body 54, the mounting surface 24 extending laterally from the body 54, the belt passage 26 extending longitudinally through the body 54, and at least one channel 56 extending longitudinally in the body 54. The channel 56 is configured to receive the wheel bar assembly 52 and is partially closed in the lateral direction, for example by projections 58 and 60 projecting in opposite normal directions from the body 54. The projections 58 and 60 extend longitudinally the length of the channel to trap the wheel bar assembly 52 against lateral and normal direction movement.

Figure 5:
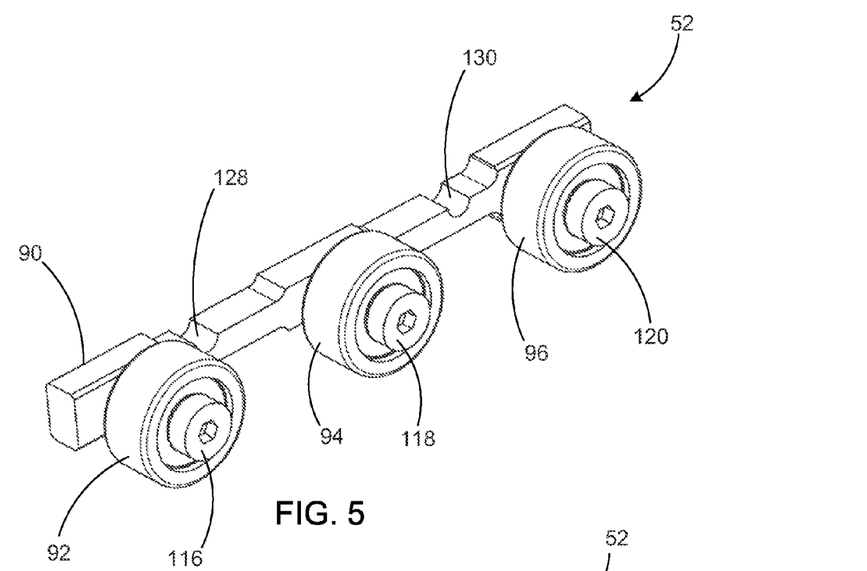
FIG. 5 is a perspective view of an exemplary wheel bar assembly according to the invention.
Figure 6:
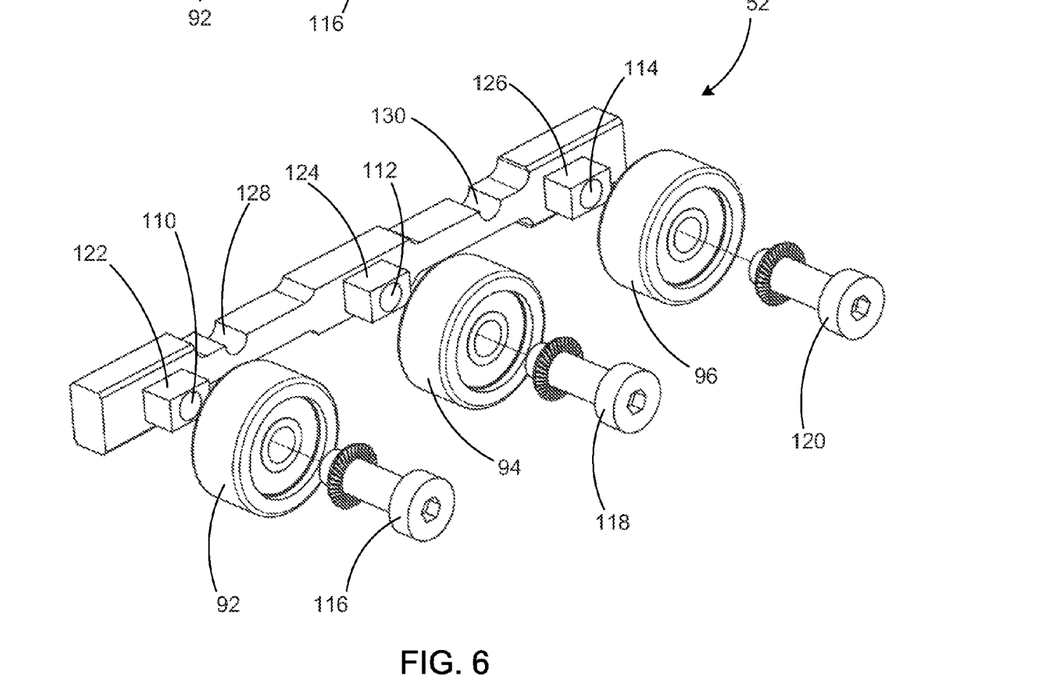
FIG. 6 is an exploded view of the exemplary wheel bar assembly.

The carriage 50 may additionally include a second channel 70 extending longitudinally in the body 54 and configured to receive a second wheel bar assembly 72 and a third channel 74 extending longitudinally in the body 54 and configured to receive a third wheel bar assembly 76. The second channel 70 is located any suitable angle, such as ninety degrees from the channel 56 and the third channel 76 is located any suitable angle such as ninety degrees from the channel 70 and is laterally aligned with the channel 56. The second channel 70 is partially closed in the normal direction by projections 78 and 80 projecting from the body 54 in opposite lateral directions. The third channel 76 is partially closed in the lateral direction by projections 82 and 84 projecting in opposite normal directions from the body 54. The projections 78, 80, 82, and 84 extend longitudinally the length of the respective channels 70 and 74. Referring now to FIGS. 4-6, the wheel bar assembly 52 includes a deflectable wheel bar 90 extending in the longitudinal direction and a plurality of wheels, and in the illustrated embodiment first, second and third wheels 92, 94, and 96 spaced longitudinally along the deflectable wheel bar 90 and mounted to the wheel bar 90 for rotation around a respective axis 98, 100, and 102 extending in the lateral direction. The deflectable wheel bar 90 is configured to be received in the first channel 56 and be deflectable relative to the carriage 50 in the normal direction when disposed in the channel 56. Clearance is provided for the deflectable wheel bar 90 in the first channel 56 so that the deflectable wheel bar 90 may shift relative to the carriage 50 prior to being fixed to the carriage.

The wheels 92, 94, and 96 may be any suitable wheel, such as a radial bearing surrounded by a plastic tread. To mount the wheels 92, 94, and 96 to the wheel bar 90 for rotation, the wheel bar 90 includes first, second and third openings 110, 112, and 114 that receive respective first, second and third screws 116, 118, and 120 that serve as axles for the respective wheels 92, 94 and 96. It will be appreciated, however, that the wheels 92, 94, and 96 may be mounted to the wheel bar 90 in any suitable manner, such as by pins projecting from the wheel bar to which the wheels 92, 94, and 96 are mounted.

The wheel bar 90 may also include first, second and third projections 122, 124, and 126 extending laterally outward from the bar. The first, second and third openings 110, 112, and 114 extend through the first, second, and third projections 122, 124, and 126 respectively so that the first, second, and third wheels 92, 94, and 96 may be laterally spaced from the wheel bar 90. The wheel bar 90 may further include at least one cutout, and in the illustrated embodiment first and second cutouts 128 and 130 on each side of the opening 112. The cutouts 128 and 130 assist with flexure of the wheel bar 90 by reducing the thickness of the bar, although it will be appreciated that the wheel bar 90 may have any suitable shape or number of cutouts at suitable locations to assist in flexure.

Figure 7:
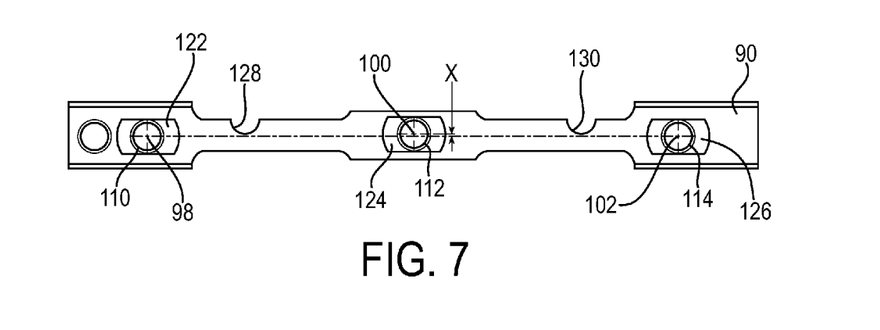
FIG. 7 is a front view of an exemplary wheel bar of the wheel bar assembly.

As best shown in FIG. 7, the axis 100 of the second wheel 94 is offset in the normal direction from the axes 98 and 102 of the first and third wheels 92 and 96, and the axes 98 and 102 may be on the same centerline. To offset the axes, the opening 112 is offset from the openings 110 and 114 by a value X that is greater than the wheel 94 to track 30 clearance. The value X plus the diameter of the wheel 94 is greater than spacing between the rails 32 and 34 such that when the wheel bar assembly 52 is inserted into the channel 56, the wheels 92 and 96 engage the lower rail 34 and the wheel 94, which initially interferes with the upper rail 32, is moved in the normal direction to engage the upper rail 32. To move the second wheel 94, the deflectable bar 90 moves in the normal direction towards the lower rail 34, thereby urging the wheel 94 to engage the upper rail 32 and remove play between the track 30 and the wheels 92, 94, and 96.

As best shown in FIGS. 2 and 3, similar to the wheel bar assembly 52, the second and third wheel bar assemblies 72 and 76 each include a respective deflectable wheel bar 140 and 142 extending in the longitudinal direction and a respective plurality of wheels 144 and 146 spaced longitudinally along the respective deflectable wheel bar 140 and 142. The plurality of wheels 144 are mounted to the wheel bar 140 for rotation around a respective axis extending in the lateral direction, and the plurality of wheels 146 are mounted to the wheel bar 142 for rotation around a respective axis extending in the normal direction.

The deflectable wheel bars 140 and 142 are configured to be received in the second and third channels 70 and 74, respectively. The deflectable wheel bar 140 is deflectable relative to the carriage 50 in the lateral direction when disposed in the second channel 70, and the deflectable wheel bar 142 is deflectable relative to the carriage 50 in the normal direction when disposed in the third channel 74. Clearance is provided for the deflectable wheel bars 142 and 142 in the respective channels 70 and 74.

The second wheel bar assembly 72 includes at least one of the plurality of wheels 144 that is offset in the lateral direction from the other of the plurality of wheels 144 similar to the first wheel bar assembly 52. The third wheel bar assembly 76 includes at least one of the plurality of wheels 146 that is offset in the normal direction from the other of the plurality of wheels 144 similar to the first wheel bar assembly 52. When the second and third wheel bar assemblies 72 and 76 are inserted into the channels 36 and 38, the respective offset wheels 144 and 146 are moved in the lateral direction and normal direction, respectively, to engage the respective rail to remove play between the tracks 36 and 38 and the plurality of wheels 144 and 146, respectively.

Figure 8:
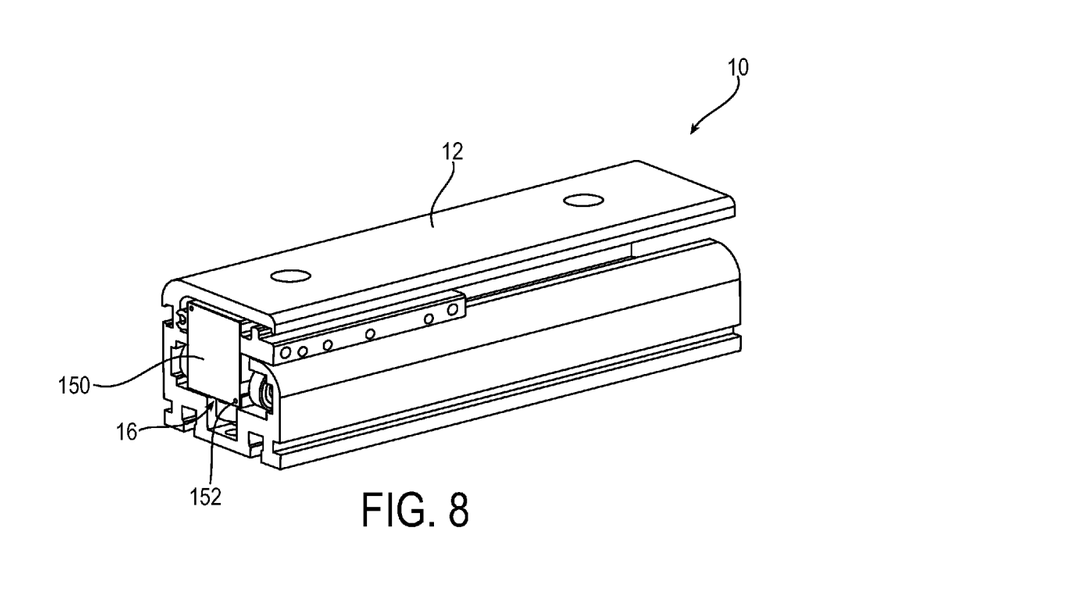
FIG. 8 is another perspective view of the exemplary actuator.

Referring again to FIGS. 2-4 and additionally to FIG. 8, during assembly of the actuator 10, the carriage assembly 16 may be assembled by inserting the wheel bar assembly 52 into the channel 56. After the wheel bar assembly 52 has been inserted into the channel 56, a suitable holding device, such as a plate 150, set screw, etc., may be attached to the carriage 50 in any suitable manner to restrict longitudinal movement of the wheel bar assembly 52 relative to the carriage 50 in at least one direction. For example, the plate 150 may be coupled to be backside of the carriage 50 by one or more fasteners 152 to prevent the wheel bar assembly 52 from moving longitudinally out of the channel 56 when the carriage assembly 16 is inserted into the passage 14. After the carriage assembly 16 has been inserted into the passage 14, the plate 150 may optionally be removed. The holding device 150 may be longitudinally spaced from the wheel 94 such that the wheel bar 90 can flex to allow the wheel 94 to move in the normal direction when the carriage assembly 16 is inserted into the passage 14. The wheel bar assemblies 72 and 76 may be assembled into the carriage in a similar manner as the wheel bar assembly 52. It will be appreciated that the wheel bar assemblies 52, 72, and 76 may be inserted into the respective channels before, during, or after insertion of the carriage assembly 16 into the passage 14.

During insertion of the carriage assembly 16 into the passage 14, the wheel bar assembly 52 is received in the track 30 and automatically adjusts such that the first and third wheels 92 and 96 engage the lower rail 34 and the second wheel 94 engages the upper rail 32. As noted above, the second wheel 94 is offset from the first and third wheels 92 and 96 a value X that is greater than the wheel 94 to track 30 clearance. As the second wheel 94 advances into the track 30, the flexible wheel bar 90 flexes in the normal direction to cause the second wheel 94 to engage the upper rail 32 and the first and third wheels 92 and 96 to engage the lower rail 34. The magnitude of the force of the first, second, and third wheels 92, 94, and 96 against the upper and lower rails 32 and 34 may be controlled by the stiffness of the flexible wheel bar 90.

Once the carriage assembly 16 is positioned in the passage 14, the flexible wheel bar 90 is fixed to the carriage 50 in the deflected state. The flexible wheel bar 90 is fixed against further deflection by a fixing device to prevent the first, second, and third wheels 92, 94, and 96 from moving relative to the carriage 50. The fixing device may be any suitable fixing device, such as an adhesive, a fastener such as a set screw, a weld, etc. For example, if the fixing device is an adhesive, the adhesive may be applied to the flexible wheel bar 90 and/or the channel 56 prior to inserting the flexible wheel bar 90 into the channel 56.

After the deflectable wheel bar is positioned in the passage 14, but prior to the adhesive hardening, the deflectable wheel bar 90 is able to flex relative to the carriage 50. Then after the first, second, and third wheels 92, 94, and 96 engage the respective upper and lower rails 32 and 34, the adhesive hardens to prevent further deflection of the deflectable wheel bar 90. Once the wheel bar assembly 52 has been fixed to the carriage 50, the play between the first, second, and third wheels 92, 94, and 96 is eliminated or significantly reduced. The actuator 10 may then be activated. During operation of the actuator 10, rotation of the shaft of the motor 20 effects movement of the belt 18, which causes the carriage assembly 16 to move longitudinally along the passage 14, thereby effecting longitudinal movement of the payload.

When the carriage 50 is positioned in the passage, the mounting surface 24 of the carriage assembly 16 extends through the slot 22, and a payload may be coupled to the mounting surface. In an embodiment, when the carriage assembly 16 is inserted into the passage, the carriage 50, and therefore the mounting surface 24 may be angled relative to the track body 12 prior to the wheel bar assembly 52 being fixed to the channel 56. For example, before the adhesive has hardened.

Similar to the first wheel bar assembly 52, during assembly of the actuator 10, the carriage assembly 16 may be assembled by inserting the wheel bar assembly 72 into the channel 70 and the wheel bar assembly 76 into the channel 74. After the wheel bar assemblies 72 and 76 have been inserted into the respective channels 70 and 74, the holding device 150 restricts longitudinal movement of the wheel bar assemblies 72 and 76. During insertion of the carriage assembly 16 into the passage 14, the wheel bar assembly 72 is received in the track 36 and automatically adjusts such that the outside wheels 144 engage one of the first or second rails 40 or 42 and the middle wheel 144 engages the other of the first or second rail 40 or 42. The wheel bar assembly 76 is received in the track 38 and automatically adjusts such that the outside wheels 146 engage one of the upper or lower rails 44 or 46 and the middle wheel 146 engages the other of the upper or lower rails 44 or 46. Once the carriage assembly 16 is positioned in the passage 14, the deflectable wheel bars 140 and 142 are fixed to the carriage 50 in their respective deflected states by a suitable fixing device. It will be appreciated that the foregoing description of the wheel bar assembly 52 is equally applicable to the wheel bar assemblies 72 and 76 except as noted.

Figure 9:
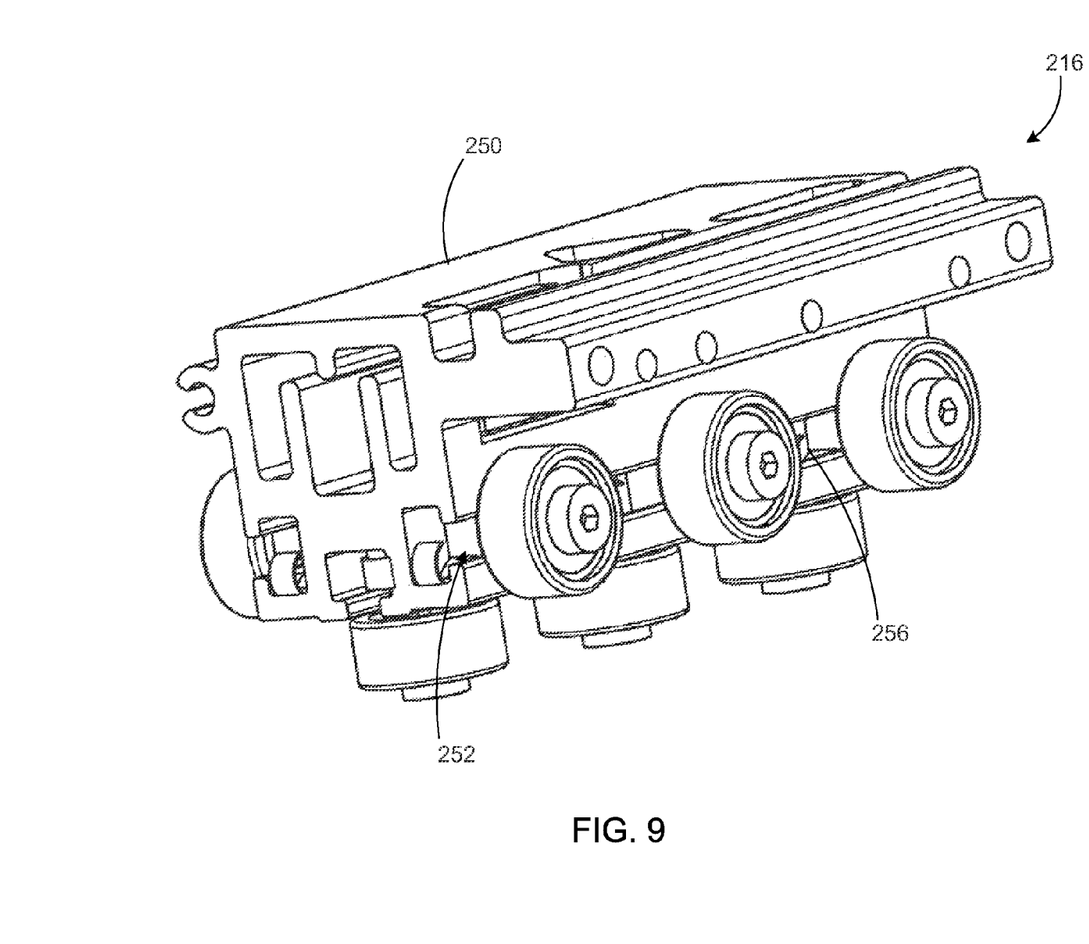
FIG. 9 is a perspective view of another exemplary carriage assembly according to the invention.
Figure 10:
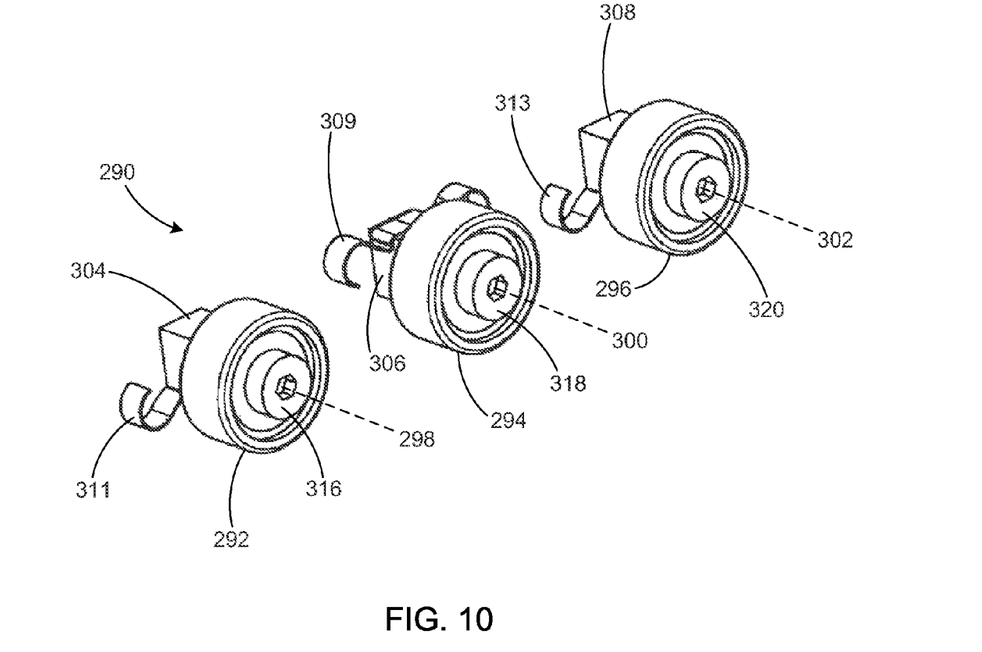
FIG. 10 is a perspective view of another exemplary wheel bar assembly according to the invention.
Figure 11:
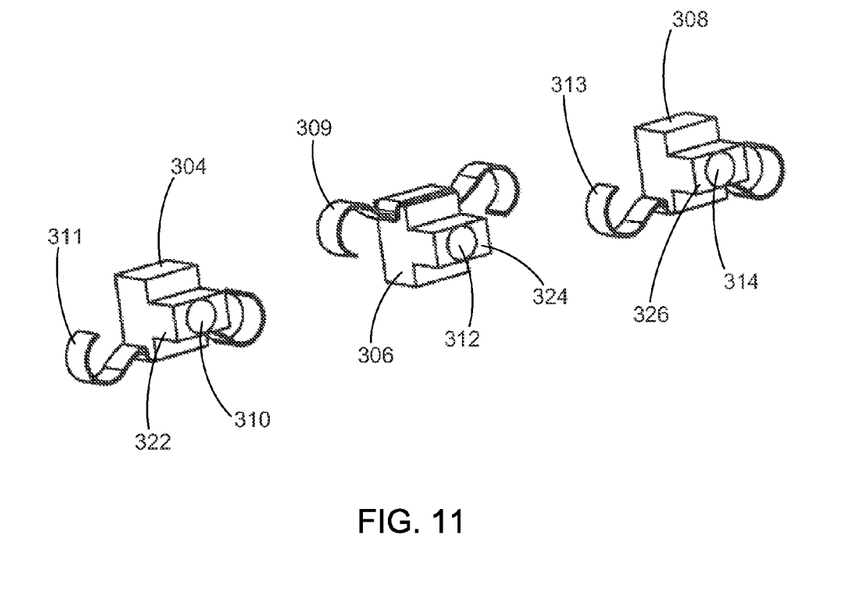
FIG. 11 is another perspective view of the wheel bar assembly of FIG. 10.

Turning now to FIGS. 9-11, an exemplary embodiment of the carriage assembly is shown at 216. The carriage assembly 216 is substantially the same as the above-referenced carriage assembly 16, and consequently the same reference numerals but indexed by 200 are used to denote structures corresponding to similar structures in the carriage assembly. In addition, the foregoing description of the carriage assembly 16 is equally applicable to the carriage assembly 216 except as noted below. Moreover, it will be appreciated upon reading and understanding the specification that aspects of the wheel bar assemblies may be substituted for one another or used in conjunction with one another where applicable.

The carriage assembly 216 includes a carriage 250 and a wheel bar assembly 252. The wheel bar assembly 252 includes an articulated wheel bar 290 composed of a suitable number of segments, such as first, second, and third segments 304, 306, and 308 configured to be longitudinally aligned in the channel 256 in the carriage 250, deflectable relative to the carriage 250 in the normal direction, and fixed to the carriage 250. The wheel bar assembly 252 also includes a plurality of wheels 292, 294, and 296 respectively mounted to the first, second, and third segments 304, 306, and 308 for rotation around a respective axis 298, 300, and 302 extending in the lateral direction. To mount the wheels 292, 294, and 296 to the segments 304, 306, and 308 for rotation, the segments includes first, second and third openings 310, 312, and 314 that receive respective first, second and third screws 316, 318, and 320 that serve as axles for the respective wheels 292, 294 and 296. The segments may also include first, second and third projections 322, 324, and 326 extending laterally outward from the segments.

At least one of the segments is deflectable relative to at least one of the other segments in the normal direction when inserted into the channel 56. For example, the segment 306 may be deflectable in the normal direction relative to the segments 304 and 308, for example by one or more resilient members 309, such as a spring pushing on a side of the segment 306. The spring 309 may be provided on a top of the segment 306 to urge the wheel 294 downward to create an offset between the wheel 294 and the wheels 292 and 296 that is greater than the wheel 294 to track 30 clearance. Alternatively, the first, second, and third wheels 292, 294, and 296 may be mounted to the respective segment 304, 306, and 308 such that the axis 300 is offset from the axes 298 and 302, and the resilient member 309 may be used to increase the offset and/or for deflecting the segment 306.

As the carriage assembly 216 is inserted into the passage 14, the wheel 294, which initially interferes with the lower rail 34, is moved in the normal direction against the spring 309 to engage the lower rail 34. The wheels 292 and 296 may biased in the opposite normal direction than the wheel 294 by respective resilient members 311 and 313, such as springs that urge the wheels 292 and 296 to engage the upper rail 32, or alternatively may be sized to fit securely in the channel 56 such that the wheels 292 and 296 engage the upper rail 32.

Once the carriage assembly 216 is positioned in the passage 14, the first, second, and third segments 304, 306, and 308 are fixed to the carriage 50 in the deflected state. The first, second, and third segments 304, 306, and 308 may be fixed against further deflection by a fixing device to prevent the first, second, and third wheels 292, 294, and 296 from moving relative to the carriage 250. The fixing device may be any suitable fixing device, such as an adhesive, a fastener such as a set screw, a weld, etc. Alternatively, the resilient members 309, 311, and 313 may be designed to create an interference fit between the first, second, and third segments 304, 306, and 308 and the channel 256 once the resilient members 309, 311, and 313 have been compressed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A carriage assembly including:
   a carriage extending in a longitudinal direction;
   at least one deflectable wheel bar extending in the longitudinal direction and being deflectable relative to the carriage in a normal direction perpendicular to the longitudinal direction and a lateral direction; and
   a plurality of wheels spaced longitudinally along the bar and mounted to the bar for rotation around a respective axis extending in the lateral direction,
   wherein the axis of at least one of the wheels is offset in the normal direction from the axis of at least one of the other wheels.

2. The carriage assembly according to claim 1, further including a fixing device for fixing the deflectable wheel bar in a deflected state to the carriage against deflection.

3. The carriage assembly according to claim 1, further including a holding device for restricting longitudinal movement of the wheel bar relative to the carriage in at least one direction.

4. The carriage assembly according to claim 3, wherein the at least one of the wheels is longitudinally spaced from the holding device such that the wheel bar can flex to allow the at least one wheel to move in the normal direction relative to the second wheel.

5. The carriage assembly according to claim 1, wherein the carriage includes a body and at least one channel extending longitudinally along the body, and wherein the deflectable wheel bar is configured to be received in the channel.

6. The carriage assembly according to claim 5, wherein the carriage includes three channels spaced ninety degrees from an adjacent one of the channels.

7. The carriage assembly according to claim 6, further including three deflectable wheel bars and three sets of wheels, each set of wheels being mounted to a respective one of the deflectable wheel bars, wherein the wheel bars are configured to be received in a respective one of the three channels.

8. The carriage assembly according to claim 1, wherein the deflectable wheel bar includes a plurality of openings corresponding to the plurality of wheels respectively, and wherein an axle extends through each wheel and the respective opening to rotatably couple the wheels to the wheel bar.

9. The carriage assembly according to claim 1, wherein the wheel bar includes a plurality of projections extending laterally outward to which the wheels are respectively coupled for laterally spacing the wheels from the wheel bar.

10. The carriage assembly according to claim 1, wherein the plurality of wheels includes a first wheel, a second wheel and a third wheel spaced longitudinally along the bar and mounted to the bar for rotation around a respective axis extending in the lateral direction, wherein the axis of the third wheel is aligned with the axis of the first wheel.

11. The carriage assembly according to claim 10, wherein the first and third wheels are each longitudinally spaced from a side of the second wheel.

12. The carriage assembly according to claim 10, wherein the wheel bar includes a cutout on each side of the second wheel.

13. A carriage assembly including:
    a carriage extending in a longitudinal direction;
    a wheel bar extending in the longitudinal direction;
    a body including at least one channel extending longitudinally along the body, wherein the wheel bar is configured to be received in the channel; and
    a plurality of wheels each having a diameter and being mounted to the wheel bar for rotation around a respective axis extending in a lateral direction;
    wherein the bar is flexible to allow at least one of the wheels to move in a normal direction perpendicular to the longitudinal direction and the lateral direction relative to the other of the plurality of wheels,
    wherein the axis of at least one wheel movable in the normal direction is offset in the normal direction from the axis of at least one of the other wheels such that when the plurality of wheels are inserted into a channel of a module body having upper and lower rails spaced from one another a distance less than the offset between the wheels plus the diameter of one of the wheels, the at least one wheel movable in the normal direction engages one of the upper or lower rail and the at least one of the other of the plurality of wheels engages the other of the upper or lower rail.

14. The carriage assembly according to claim 13, further including a fixing device for fixing the deflectable wheel bar in a deflected state to the carriage against deflection.

15. The carriage assembly according to claim 13, further including a holding device for restricting longitudinal movement of the wheel bar relative to the carriage in at least one direction.

16. The carriage assembly according to claim 15, wherein at least one of the wheels is longitudinally spaced from the holding device such that the bar can flex to allow the at least one wheel to move in the normal direction relative to the other wheels.

17. The carriage assembly according to claim 13, wherein the carriage includes three channels spaced ninety degrees from an adjacent one of the channels.

18. The carriage assembly according to claim 17, further including at least three deflectable wheel bars and at least three sets of first and second wheels, each set of wheels being mounted to a respective one of the deflectable wheel bars, wherein the wheel bars are configured to be received in a respective one of the three channels.

19. A module including:
    a track body having a length extending in a longitudinal direction, a width extending in a lateral direction and a height extending in a normal direction perpendicular to the longitudinal and lateral direction, the track body including at least one channel extending in the longitudinal direction, the at least one channel having upper and lower rails spaced from one another; and
    a carriage assembly movable relative to the track body, the carriage assembly including:
      a carriage extending in the longitudinal direction;
      a wheel bar deflectable from a normal state to a deflected state, the wheel bar being fixed to the carriage in the deflected state; and
      a plurality of wheels spaced longitudinally along the wheel bar and mounted to the wheel bar for rotation around a respective axis extending in the lateral direction, the axis of the at least one of the wheels being offset in the normal direction from the axis of at least one of the other wheels, wherein when the wheels of the carriage assembly are inserted into the channel, at least one of the wheels engages the upper rail and at least one of the wheels engages the lower rail.

20. The module according to claim 19, wherein the upper and lower rails are spaced apart in the normal direction a distance less than the offset between the wheels plus a diameter of the wheels.

21. The module according to claim 19, wherein the carriage includes a body and at least one channel extending longitudinally along the body, and wherein the wheel bar is configured to be received in the channel and fixed in the channel.

22. The carriage assembly according to claim 21, wherein the carriage includes three channels spaced ninety degrees from an adjacent one of the channels.

23. The carriage assembly according to claim 22, further including three deflectable wheel bars and three sets of wheels, each set of wheels being mounted to a respective one of the deflectable wheel bars, wherein the wheel bars are configured to be received in a respective one of the three channels.

24. The carriage assembly according to claim 19, wherein the track body includes a plurality of channels having upper and lower rails respectively spaced from one another, wherein the upper and lower rails of at least one of the channels are spaced apart in the normal direction and the upper and lower rails of another one of the at least one channels are spaced apart in the lateral direction.

25. The carriage assembly according to claim 24, wherein the carriage includes a plurality of wheel bars and a plurality of sets of wheels being fixed to a corresponding one of the plurality of wheel bars, wherein each set of wheels are inserted into a respective one of the plurality of channels.

* * * * *